US011686610B2

(12) United States Patent
Gu et al.

(10) Patent No.: US 11,686,610 B2
(45) Date of Patent: Jun. 27, 2023

(54) OPERATIONAL CONDITION MONITORING SYSTEM

(71) Applicant: Fluid Handling LLC, Morton Grove, IL (US)

(72) Inventors: James J. Gu, Buffalo Grove, IL (US); Florin Rosca, Niles, IL (US); Tomm V. Aldridge, Olympia, WA (US); Stephen Clark, Beverly, MA (US); Damien Galzin, Monts (FR)

(73) Assignee: FLUID HANDLING LLC, Morton Grove, IL (US)

( * ) Notice: Subject to any disclaimer, the term of this patent is extended or adjusted under 35 U.S.C. 154(b) by 93 days.

(21) Appl. No.: 17/110,713

(22) Filed: Dec. 3, 2020

(65) Prior Publication Data
US 2021/0164828 A1 Jun. 3, 2021

Related U.S. Application Data

(60) Provisional application No. 62/942,998, filed on Dec. 3, 2019.

(51) Int. Cl.
*G01H 1/00* (2006.01)
*G01M 13/045* (2019.01)
(Continued)

(52) U.S. Cl.
CPC .............. *G01H 1/003* (2013.01); *G01D 21/02* (2013.01); *G01K 13/08* (2013.01); *G01M 13/045* (2013.01); *H02K 11/25* (2016.01)

(58) Field of Classification Search
CPC ........ H02K 11/25; H02K 11/35; G01H 1/003; G01M 13/045; G01K 13/08; G01K 11/125; G01D 11/30; G01D 21/02
(Continued)

(56) References Cited

U.S. PATENT DOCUMENTS 5,726,911 A 3/1998 Canada et al.
5,841,255 A * 11/1998 Canada ................. H02K 11/25
318/647
(Continued)

FOREIGN PATENT DOCUMENTS

CN 102788645 B 8/2014
CN 105466707 A 4/2016
(Continued)

OTHER PUBLICATIONS

Condition Monitoring Wireless Vibration Sensor PCE-VMS 504; downloaded Jul. 4, 2020. https://www.pce-instruments.com/us/measuring-instruments/test-meters/condition-monitoring-pce-instruments-condition-monitoring-wireless-vibration-monitor-pce-vms-504-det_2133404.htm.
(Continued)

*Primary Examiner* — John H Le
(74) *Attorney, Agent, or Firm* — Ware, Fressola, Maguire & Barber LLP

(57) ABSTRACT

A condition monitoring device for monitoring machinery includes a combination of on-board sensors and a condition monitoring module. The on-board sensors include modules for non-contact temperature, magnetic flux and 3-axis vibration sensing of the machinery. The condition monitoring module provides a condition monitoring signal containing information about an operating condition of the machinery, based upon a data synthesis condition monitoring technique that synthesizes non-contact temperature, magnetic flux and 3-axis vibration sensed data received from the combination of on-board sensors, determines a current operating condition of the machinery, and compares the current operating condition and the baseline operating condition of the machinery.

23 Claims, 10 Drawing Sheets

The Condition Monitoring Device

(51) Int. Cl.
*H02K 11/25* (2016.01)
*G01K 13/08* (2006.01)
*G01D 21/02* (2006.01)

(58) Field of Classification Search
USPC .......................................................... 702/56
See application file for complete search history.

(56) References Cited

U.S. PATENT DOCUMENTS

| | | | | |
|---|---|---|---|---|
| 5,952,803 | A * | 9/1999 | Canada | G01R 33/028 |
| | | | | 73/431 |
| 6,124,692 | A * | 9/2000 | Canada | H02K 11/20 |
| | | | | 318/490 |
| 6,138,078 | A * | 10/2000 | Canada | H02K 11/33 |
| | | | | 702/56 |
| 6,222,454 | B1 * | 4/2001 | Hading | G01J 5/20 |
| | | | | 250/339.04 |
| 6,297,742 | B1 * | 10/2001 | Canada | G07C 3/00 |
| | | | | 361/23 |
| 6,472,865 | B1 | 10/2002 | Tola et al. | |
| 6,839,660 | B2 | 1/2005 | Eryurek et al. | |
| 7,283,914 | B2 | 10/2007 | Poorman et al. | |
| 7,468,594 | B2 | 12/2008 | Svensson et al. | |
| 7,559,242 | B2 | 7/2009 | Wang et al. | |
| 7,578,193 | B2 | 8/2009 | Davidson | |
| 8,478,548 | B2 | 7/2013 | Hudson et al. | |
| 8,594,969 | B2 | 11/2013 | Lill et al. | |
| 8,913,955 | B1 | 12/2014 | Mincher | |
| 8,935,038 | B2 | 1/2015 | Chinnadurai | |
| 9,008,997 | B2 | 4/2015 | Srinivasa et al. | |
| 9,185,365 | B2 | 11/2015 | Hong et al. | |
| 9,251,690 | B2 | 2/2016 | Heydron | |
| 9,484,791 | B2 | 11/2016 | Brockerhoff et al. | |
| 9,912,265 | B2 | 3/2018 | Skinner | |
| 9,913,006 | B1 | 3/2018 | Wascat et al. | |
| 9,924,245 | B2 | 3/2018 | Zhuge et al. | |
| 10,006,487 | B2 | 6/2018 | Hwang et al. | |
| 10,184,986 | B2 | 1/2019 | Pinto et al. | |
| 10,393,621 | B2 | 8/2019 | Jaramillo-Velasques et al. | |
| 2002/0146057 | A1 * | 10/2002 | Barron, Jr. | G01J 5/026 |
| | | | | 374/128 |
| 2004/0181357 | A1 | 9/2004 | Tsao et al. | |
| 2005/0171736 | A1 | 8/2005 | Kang | |
| 2010/0169030 | A1 | 7/2010 | Parlos | |
| 2012/0181967 | A1 | 7/2012 | Fulton et al. | |
| 2013/0018626 | A1 | 1/2013 | Chi et al. | |
| 2013/0021165 | A1 | 1/2013 | Stokes | |
| 2013/0169452 | A1 | 7/2013 | Fang | |
| 2015/0287318 | A1 | 10/2015 | Nair et al. | |
| 2017/0073936 | A1 | 3/2017 | Johnson et al. | |
| 2017/0170773 | A1 * | 6/2017 | Donolo | G05B 19/4062 |
| 2018/0327199 | A1 | 11/2018 | Mair | |
| 2019/0064032 | A1 | 2/2019 | Laricchiuta et al. | |
| 2019/0146478 | A1 | 5/2019 | Cella et al. | |
| 2019/0219377 | A1 | 7/2019 | Denk et al. | |
| 2019/0320245 | A1 | 10/2019 | Loychik et al. | |
| 2019/0324434 | A1 | 10/2019 | Cella et al. | |
| 2019/0346823 | A1 * | 11/2019 | Josebeck | G05B 19/4184 |
| 2020/0182684 | A1 | 6/2020 | Yoskovitz et al. | |
| 2020/0204213 | A1 | 6/2020 | Dvorsky et al. | |

FOREIGN PATENT DOCUMENTS

| | | |
|---|---|---|
| DE | 10223428 A1 | 1/2004 |
| FR | 3054388 A3 | 1/2018 |
| JP | 2013029484 A | 2/2013 |
| TW | 201633024 A | 9/2016 |
| WO | 2019/086969 A1 | 5/2019 |
| WO | 2019/123078 A1 | 6/2019 |
| WO | 2020/095303 A1 | 5/2020 |

OTHER PUBLICATIONS

Demands on Sensors for Future Servicing: Smart Sensors for Condition Monitoring by Thomas Brand Analog Devices; 2018; pp. 1-4. https://www.analog.com/media/en/technical-documentation/tech-articles/A60151-Demands-on-Sensors-for-Future-Servicing-Smart-Sensors-for-Condition-Monitoring.pdf.
Sensors for Condition Monitoring Home Innovations White Paper Updated Mar. 5, 2019. https://www.ni.com/en-us/innovations/white-papers/14/sensors-for-condition-monitoring.html.
Condition Monitoring in Existing Systems; downloaded Jul. 4, 2020. https://www.turck.de/en/whitepaper-35157.php?dlItemId=35197.
Grahn, Pontus. "Utilization of a tailormade condition monitoring device for third party motors" (2018); pp. 9-24. http://www.diva-portal.se/smash/get/diva2:1249547/FULLTEXT01.pdf.
Murcinkova, Zuzana, Jaromir Murcinko, and Pavel Adamcik. "The multi-parameter on-line monitoring system applied for rotating machinery." Review of Industrial Engineering Letters 3.2 (2016): pp. 19-28. http://www.conscientiabeam.com/pdf-files/eng/71/RIEL-2016-3(2)-19-28.pdf.
English translation of TW 201633024A.
English translation of JP 2013029484A.
English translation of FR 3054388A3.
English translation of DE 10223428A1.
English translation of CN 105466707A.
English translation of CN 102788645B.
Sharatchandra Singh, W., et al. "GMR-based magnetic flux leakage technique for condition monitoring of steel track rope." Insight-Non-Destructive Testing and Condition Monitoring 53.7 (2011): pp. 377-381. https://booksc.xyz/dl/49095464/5b5992.
Frosini, L., et al. "Development of a leakage flux measurement system for condition monitoring of electrical drives." 8th IEEE Symposium on Diagnostics for Electrical Machines, Power Electronics & Drives IEEE, 2011: pp. 356-363.. https://booksc.xyz/dl/22326532/56ef80.
Ansari, Saleem A., and Rauf Baig. "A PC-based vibration analyzer for condition monitoring of process machinery." IEEE Transactions on Instrumentation and Measurement 47.2 (1998): pp. 378-383. https://www.researchgate.net/profile/Abdul_Baig2/publication/3089228_A_PC-based_vibration_analyzer_for_condition_monitoring_of_process_machinery/links/582c25f108ae004f74afd8ed.pdf.
Kang, Keun-Young, Mohamed A. Ahmed, and Young-Chon Kim. "Implementation of condition monitoring and control system for small-scale wind turbines." IECON 2014—40th Annual Conference of the IEEE Industrial Electronics Society. IEEE, 2014: pp. 2122-2127. https://www.researchgate.net/profile/Mohamed_A_Ahmed/publication/265414530_Keun-Young_Kang_Mohamed_A_Ahmed_and_Young-Chon_Kim_Implementation_of_Condition_Monitoring_and_Control_Syetem_for_Small-scale_Wind_Turbines_40th_Annual_Conference_of_the_IEEE_Industrial_electronics_Soc.
Touret, T., et al. "On the use of temperature for online condition monitoring of geared systemsA review." Mechanical Systems and Signal Processing 101 (2018): pp. 197-210. https://booksc.xyz/dl/67065269/2fc308.
Bagavathiappan, Subramaniam, et al. "Infrared thermography for condition monitoring A review." Infrared Physics & Technology 60 (2013): pp. 35-55. https://booksc.xyz/dl/21352968/117a9c.

* cited by examiner

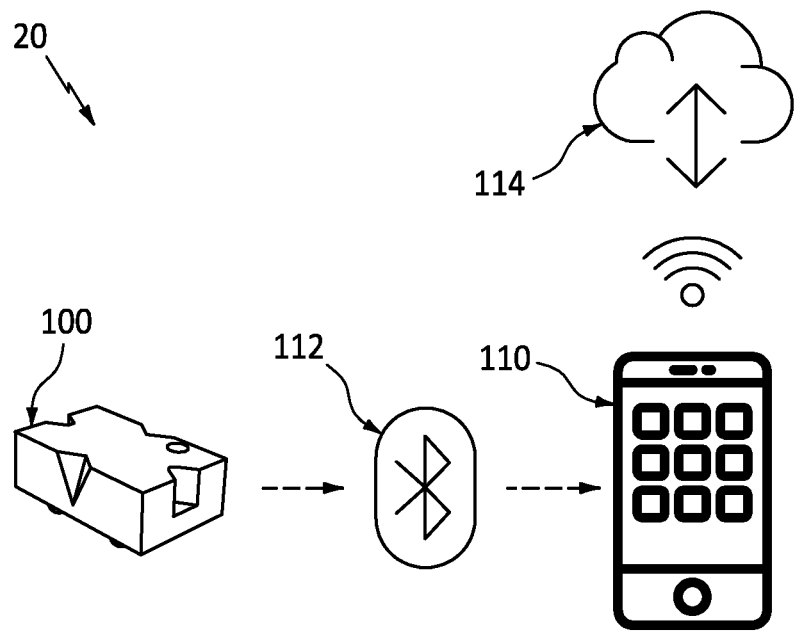
FIG. 1A: Example of Basic Condition Monitoring System Configuration
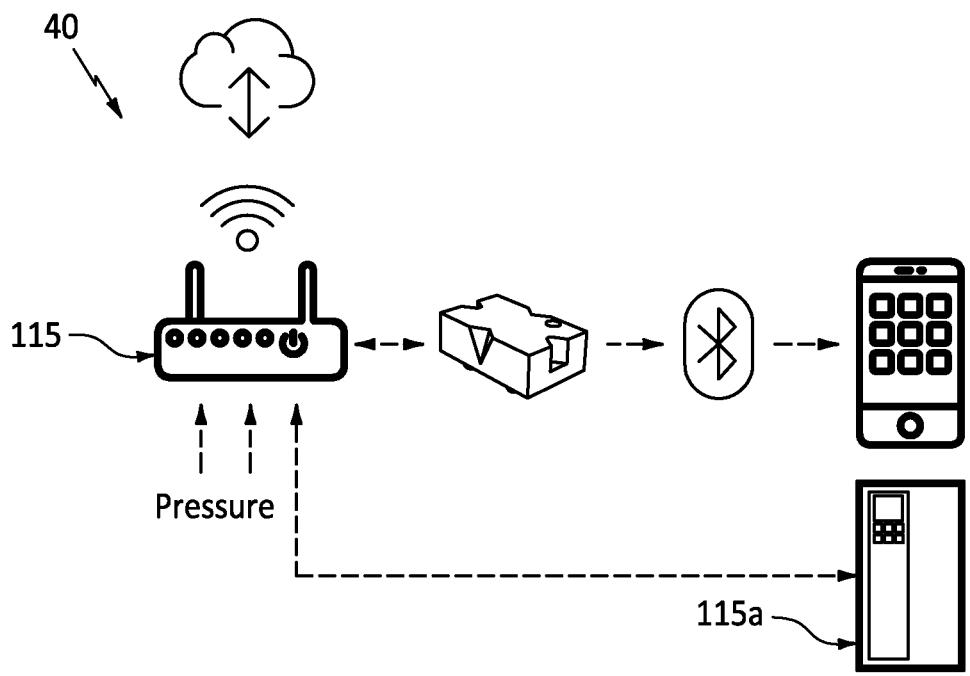
FIG. 1B: Example of Condition Monitoring System Configuration with Additional Sensors

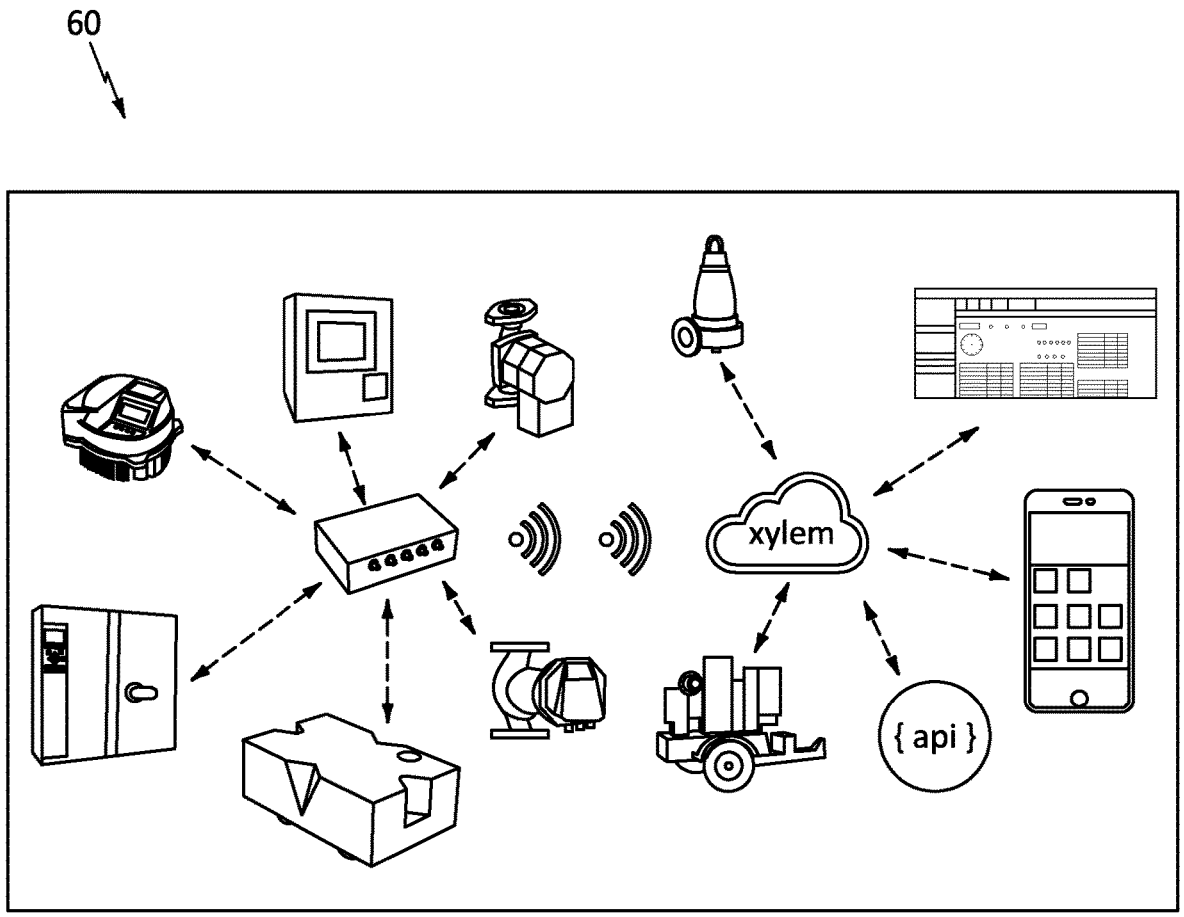
FIG. 1C: Example of Condition Monitoring System Configuration in an Ecosystem

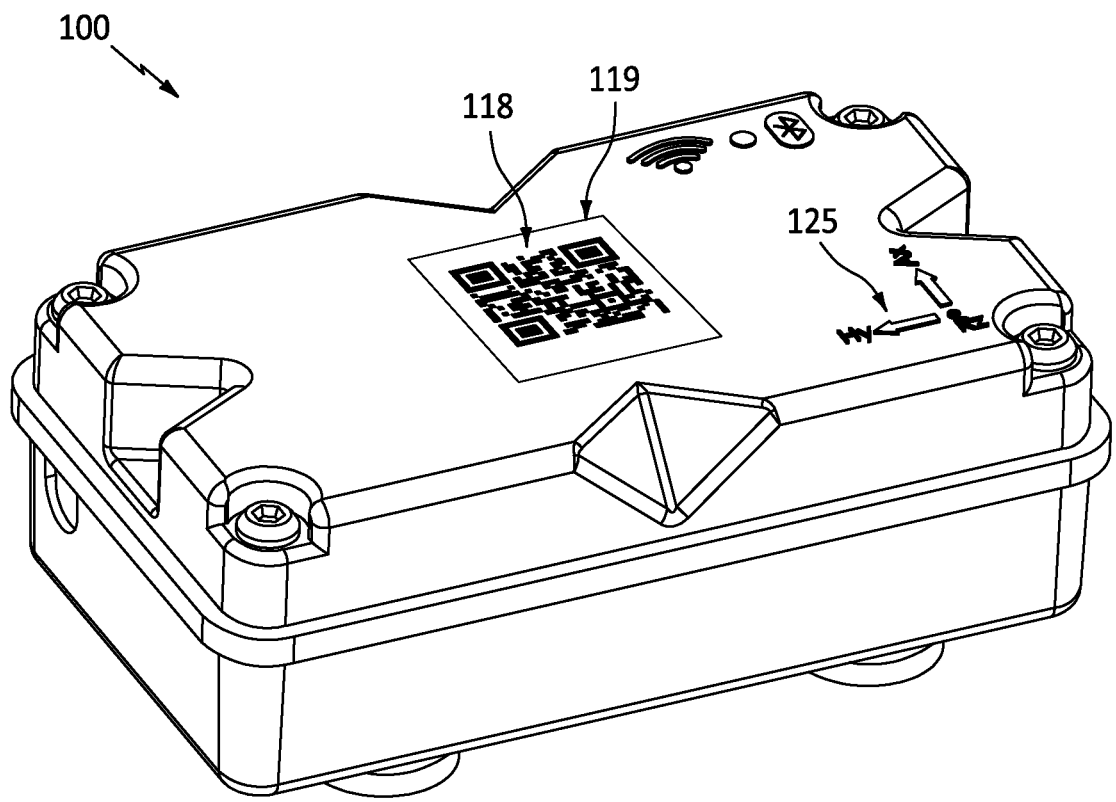
FIG. 2A: The Condition Monitoring Device

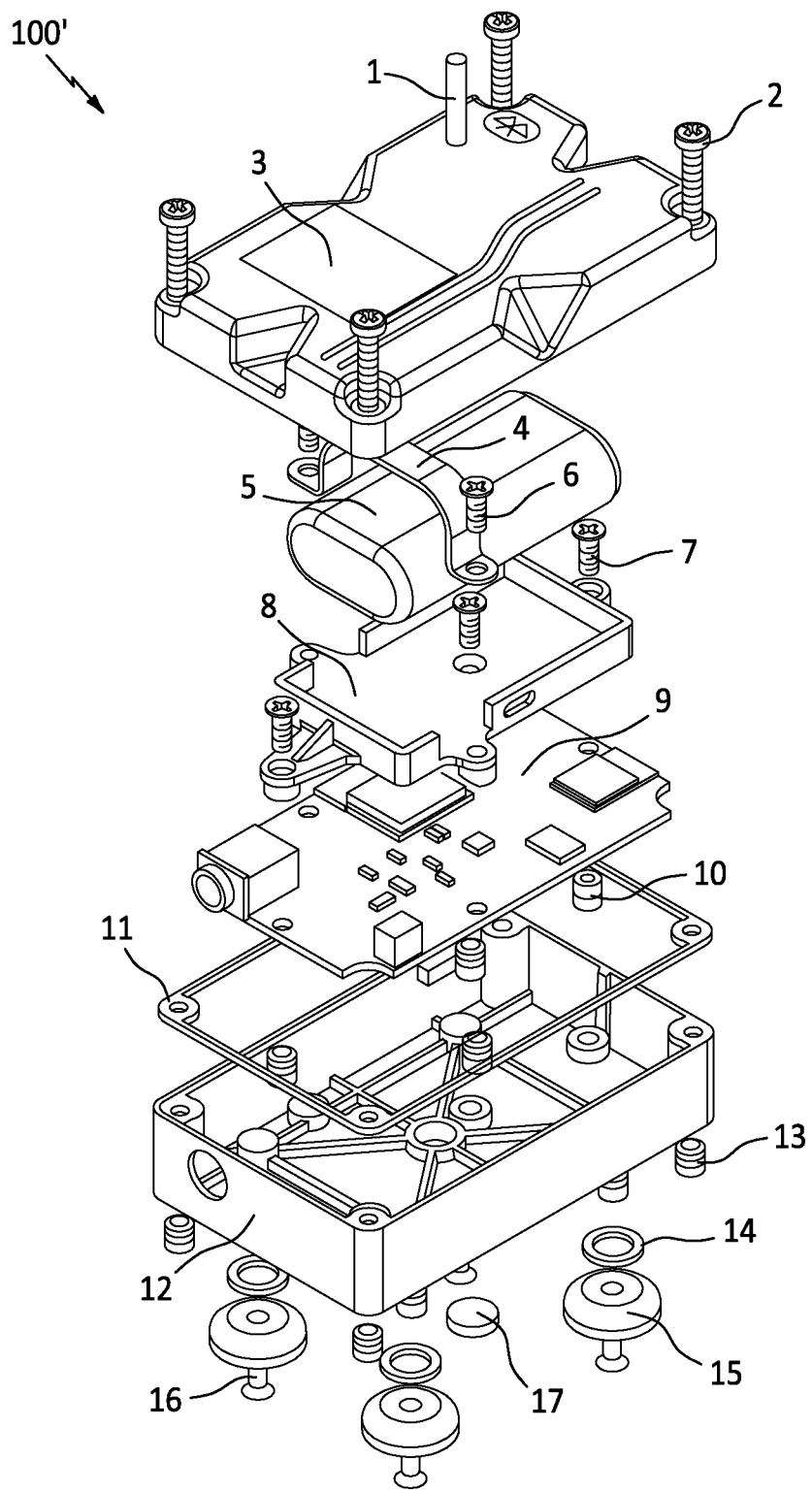
*FIG. 2B*: Example of Condition Monitoring Device Configuration

| ITEM NO. | DESCRIPTION | PART NUMBER | QTY. |
|---|---|---|---|
| 1 | LED_Tube | 3M660-2-clear | 1 |
| 2 | Locking_Screw | McMaster P/N 95345A450 | 4 |
| 3 | Cover | Custom_Part | 1 |
| 4 | Battery_Strap | Custom_Part | 1 |
| 5 | Battery Pack | ER14505-1S2P | 1 |
| 6 | Locking_Screw | McMaster P/N 95345A436 | 2 |
| 7 | Screw | McMaster P/N 91771A108 | 3 |
| 8 | Battery_Holder | Custom_Part | 1 |
| 9 | PCBA | Custom_Part | 1 |
| 10 | Blind_Insert | PennEngineering P/N IBB-440 | 9 |
| 11 | Rubber_Gasket | Custom_Part | 1 |
| 12 | Bottom | Custom_Part | 1 |
| 13 | Through_Insert | PennEngineering P/N ITB-440 | 4 |
| 14 | Magnet_O_Ring | McMaster P/N 9262K595 | 4 |
| 15 | Radial_Magnet | P/N 8217 | 4 |
| 16 | Screw | McMaster P/N 91771A107 | 4 |
| 17 | Lens | Custom_Part | 1 |

Figure 2C. Components List of System Configuration in Figure 2B

A condition monitoring device 100, 100' for monitoring machinery or equipment

A combination of on-board sensors 101 may include:

a non-contacting temperature sensing module 102 configured to receive control signaling and provide a non-contacting temperature sensing signal containing information about a temperature of the machinery without direct surface contact between the non-contacting temperature sensing module and the machinery;

a magnet flux sensing module 104 configured to receive the control signaling and provide a magnet flux sensing signal containing information about magnet flux sensed from the machinery; and a 3-axis vibration measurement module 106 configured to receive the control signaling and provide a 3-axis vibration measurement sensing signal containing information about a 3-axis vibration measurement of the machinery.

A condition monitoring module 108 configured to:

provide the control signaling to the combination of sensors, receive a baseline operating condition signal containing information about a baseline operating condition of the machinery, the non-contacting temperature sensing signal, the magnet flux sensing signal, and the 3-axis vibration measurement sensing signal from the combination of sensors, and provide a condition monitoring signal containing information about an operating condition of the machinery, based upon a data synthesis condition monitoring technique that synthesizes non-contact temperature sensing, magnetic flux and 3-axis vibration data received from the combination of sensors, determines a current operating condition of the machinery, and compares the current operating condition and the baseline operating condition of the machinery.

Other signal processor circuits, circuitry, or components 109 that do not form part of the underlying invention, e.g., including input/output modules/modems, one or more memory modules (e.g., RAM, ROM, etc.), data, address and control busing architecture, etc.

Figure 3: The Condition Monitoring Device

A system 40 for monitoring machinery

A condition monitoring device 100, 100', also having a wireless communication pairing module 120 configured to provide wireless communication pairing signaling containing information for pairing the condition monitoring device; and a cover assembly 3, 12 (Fig. 2B) having a Quick Response (QR) code 118 (Fig.2A) arranged thereon to be scanned in order to receive QR code signaling containing information for pairing the condition monitoring device.

A wireless communication enabled device 110 includes:

a QR scanning app or module 110a configured to scan the QR code, and receive QR code signaling, and a pairing app or module 110b configured to receive the wireless communication pairing signaling and QR code signaling, and pair the wireless communication enabled device with the condition monitoring device based upon the signaling received.

Other sensors collectively indicated as 116 for detecting pressure, flow rate, fluid quality, motor load condition, power consumption or efficiency, fluid viscosity, etc., of the machinery or equipment.

Figure 4:: The Condition Monitoring System

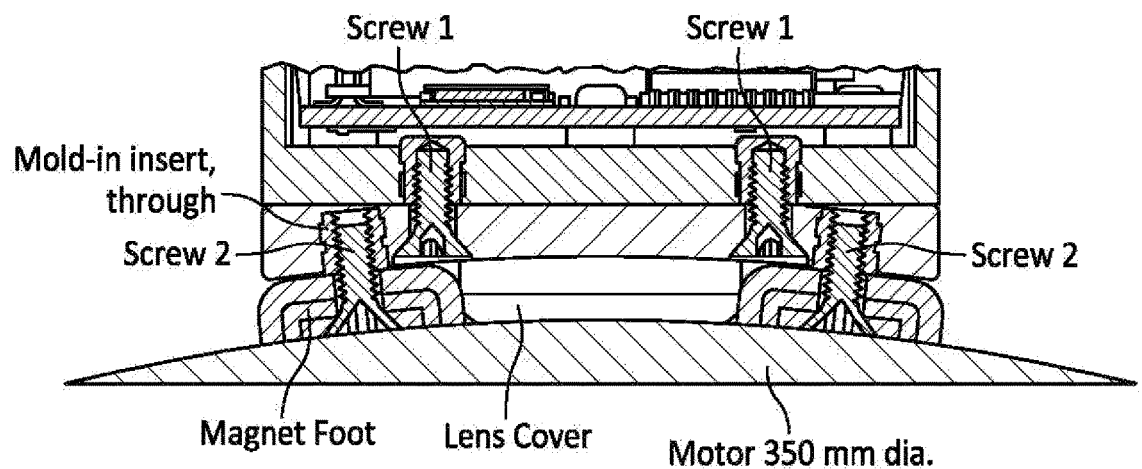
FIG. 5A : Example of Mounting Configuration
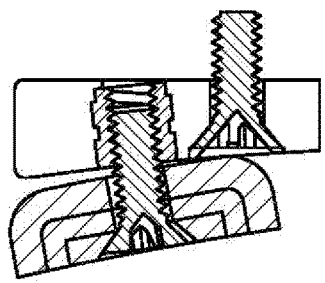
200 mm dia.
FIG. 5B
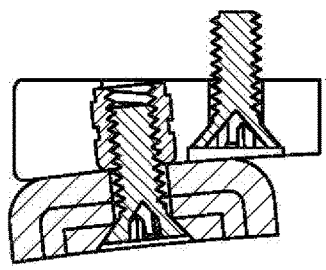
350 mm dia.
FIG. 5C
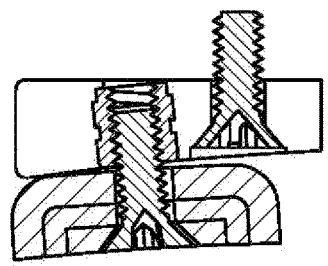
500 mm dia.
FIG. 5D

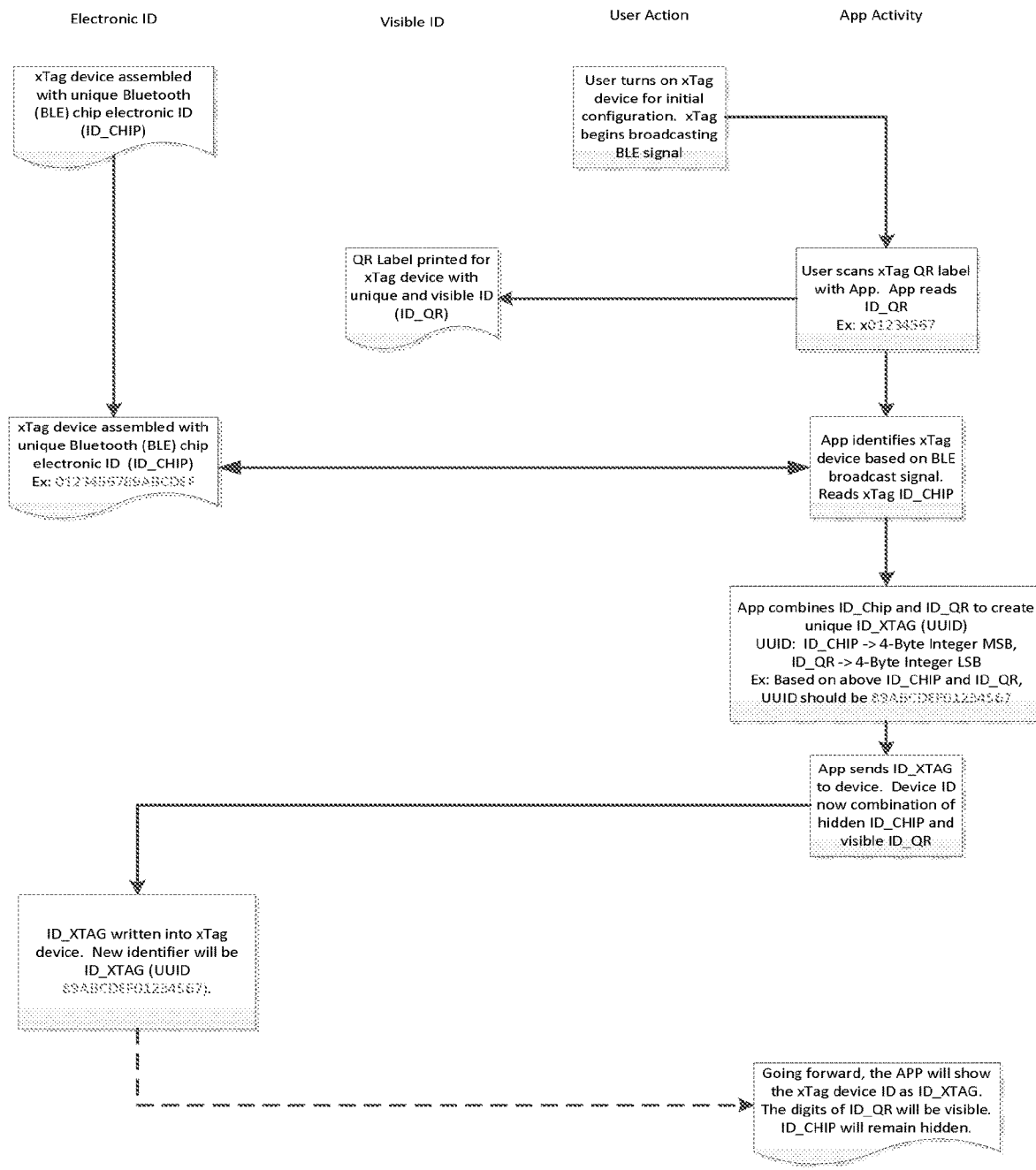
Figure 6: Flowchart of Process to Create System UUID

|  |  | Condition Monitoring Device (Figure 1A) | | | Condition Monitoring System (Figures 1B & 1C) | | |  |
| --- | --- | --- | --- | --- | --- | --- | --- | --- |
| Scenario | Observations | Flux | IR Temp | Vibration | Pressure | Flow Rate | Power | Potential issue... |
| Closed Valve | Single Sensor | Decrease |  |  |  |  |  | Motor issue 50% / 50% |
| Closed Valve | Single Sensor |  |  | Increase |  |  |  | Bearing Failure 90% |
| Closed Valve | Dual Sensor |  |  | Increase | Increase |  |  | Can't be bearing failure, Pressure should drop |
| Closed Valve | Single Sensor |  |  |  |  |  | Decrease | Motor issue 50% / 50% transformer issue |
| Closed Valve | Single Sensor |  |  |  | Increase |  |  | System issue |
| Closed Valve | Single Sensor |  |  |  |  | Decrease |  | Pump issue |
| Closed Valve | xTag | Decrease | Increase | Increase | Increase | Decrease | Decrease | Different Diagnosis: 80% System problem |

Figure 7A: Sensor deviation from baseline operating conditions for closed valve scenarios.

|  |  | Condition Monitoring Device (Figure 1A) | | | Condition Monitoring System (Figures 1B & 1C) | | |  |
| --- | --- | --- | --- | --- | --- | --- | --- | --- |
| Scenario | Observations | Flux | IR Temp | Vibration | Pressure | Flow Rate | Power | Potential issue |
| Bearing Failure | Single Sensor |  | Increase |  |  |  |  | Potential motor or system pressure issue |
| Bearing Failure | Single Sensor |  |  | Increase |  |  |  | Potential bearing issue, mounting issues, motor issue, cavitation, mis-alignment in coupling |
| Bearing Failure | Single Sensor |  |  |  |  |  | Increase | Potential system issue, motor problem, quality of incoming power |
| Bearing Failure | xTag | No change initially | Increase | Increase | No change initially | No change initially | Increase |  |

Figure 7B: Sensor deviation from baseline operating conditions for bearing failure scenarios.

OPERATIONAL CONDITION MONITORING SYSTEM

CROSS-REFERENCE TO RELATED APPLICATION

This application claims benefit to provisional patent application Ser. No. 62/942,998, filed 3 Dec. 2019, which is hereby incorporated by reference in its entirety.

BACKGROUND OF THE INVENTION

1. Field of the Invention

The present invention relates to a condition monitoring device; and more particularly relates to a condition monitoring device for machinery or equipment.

2. Brief Description of Related Art

There are known devices that monitor conditions of machinery or equipment. By way of example, the known devices:
Measure temperature with a sensor requiring contact with the surface to be measured;
Measure vibration in 2 or 3 axes, and collect raw vibration data and calculate Root Mean Square (RMS) values;
Estimate machine/pump run time based on run time of vibration measurements;
Store up to 170 days of data based on taking hourly measurements;
Are fully potted and cannot replace batteries;
Are rated for function in explosion proof/intrinsically safe operating environments;
Have LED indications for device operation and/or alarm status; and/or
Transmit data via Bluetooth radio communication to a mobile app and/or Gateway (recently introduced to market).
The aforementioned provisional application includes a list of companies that provide one or more of the known devices.

Shortcomings of the Above Mentioned Known Devices

By way of example, shortcomings of the known devices include one or more of the following:
Existing products use contact for thermal measurements, which requires mounting space and some level of intimate contact and/or compressive force for thermal measurements (e.g., either through magnetic, bolted or adhesive/epoxied mounting).
Some known devices have parts that require drilling and tapping of the rotational equipment for mounting of the measurement device.
Some known devices are not able to measure rotation direction.
Some known devices only measure 1 or 2 axis vibration.
Some known devices are only battery powered without an option for replacement of batteries.
Known devices have wireless communication methods. In some known devices, communication is to a dedicated hub, and cannot be networked directly from one measurement device to another.

In view of the aforementioned, there is a need in the industry for a better condition monitoring device for monitoring machinery or equipment.

SUMMARY OF THE INVENTION

In summary, the present invention provides a new and unique condition monitoring device that may include a combination of the following:
Non-contact sensing, e.g., infrared (IR), for thermal measurements, which eliminates the need for direct surface contact.
Magnetic mounting to bearing housings, motor housings, or other rotation devices, to avoid drilling and tapping.
Flexible mounting to a motor, bearing and other surfaces using magnetic and mechanical methods (see FIGS. 5A and 5B—Mounting Configuration).
A magnetic flux sensor with Fast Fourier Transform (FFT) analysis into the sensing package allowing determination of many aspect of the motor/system condition, including but not limited to, the rotating direction, rotating speed, motor load, and motor health.
A 3-axis vibration measurement with FFT analysis. The 3-axis vibration analysis allows for indications of potential bearing problems that could not be detected with 1 or 2 axis sensors.
The option of using external power and/or replaceable internal battery power.
An option for wired and wireless communication with a Gateway for faster communication and communication in environments which may be electromagnetically noisy.
A capability of being networked to one another, creating a mesh network for an expanded communication range.
A capability of interfacing with $3^{rd}$ party devices, including pressure sensors, flow sensors, temperature sensors, Variable Frequency Drives, etc.
A magnetically actuated Reed switch to trigger wireless communication (e.g., Bluetooth) pairing.
an LED configuration on the measurement device to indicate one or more functional states.
A Unique User ID (UUID) from a combination of a visible Quick Response (QR) label arranged or printed on the measurement device and a hidden wireless communication (e.g., Bluetooth) chip identifier. This allows an operator who reviews the data to match the data to the visible QR code number, but also maintains security by having half the UUID hidden.
Data collected through this condition monitoring system may be utilized in a machine learning system (i.e. digital twin) for predictive analysis purposes.

Specific Embodiments

According to some embodiments, the present invention may take the form of a condition monitoring device for monitoring machinery or equipment, featuring a combination of on-board sensors and a condition monitoring module.
The combination of on-board sensors may include:
a non-contacting temperature sensing module configured to receive control signaling and provide a non-contacting temperature sensing signal containing information about a temperature of the machinery or equipment without direct surface contact between the non-contacting temperature sensing module and the machinery or equipment;

a magnet flux sensing module configured to receive the control signaling and provide a magnet flux sensing signal containing information about magnet flux sensed from the machinery or equipment; and a 3-axis vibration measurement module configured to receive the control signaling and provide a 3-axis vibration measurement sensing signal containing information about a 3-axis vibration measurement of the machinery or equipment.

The condition monitoring module may be configured to provide the control signaling to the combination of on-board sensors, receive a baseline operating condition signal containing information about a baseline operating condition of the machinery or equipment, receive the non-contacting temperature sensing signal, the magnet flux sensing signal, and the 3-axis vibration measurement sensing signal from the combination of on-board sensors, and provide a condition monitoring signal containing information about an operating condition of the machinery or equipment, based upon a data synthesis condition monitoring technique that synthesizes non-contact temperature sensing, magnetic flux and 3-axis vibration data received from the combination of on-board sensors, determines a current operating condition of the machinery or equipment, and compares the current operating condition and the baseline operating condition of the machinery or equipment to determine the operating condition.

The condition monitoring device may also include one or more of the following features:

The non-contacting temperature sensing module may be configured to provide infrared (IR) signaling to the machinery or equipment and receive reflected IR signaling from the machinery or equipment containing information about the temperature of the machinery or equipment.

The condition monitoring device may include a cover assembly configured to contain the combination of on-board sensors and condition monitoring module, the cover assembly having a bottom cover with an infrared sensor window configured therein; and the non-contacting temperature sensing module may be configured to provide the IR signaling through the infrared sensor window and receive the reflected IR signaling back through the infrared sensor window.

The magnet flux sensing module may be configured to implement a Fast Fourier Transform (FFT) analysis and determine a rotation direction, rotating speed, motor load and motor health of the machinery or equipment.

The 3-axis vibration measurement module may be configured to sense a 3-axis vibration of a motor shaft of the machinery or equipment and implement a 3-axis vibration analysis and detect potential bearing problems of the machinery or equipment that could otherwise not be detected using 1-axis or 2-axis vibration analysis. The 3-axis vibration analysis may include using an X-axis aligned to sense axial vibration of the motor shaft, a Y-axis aligned to sense horizontal vibration of the motor shaft and a Z-axis aligned to sense radial vibration of the motor shaft.

The condition monitoring module may be configured to implement a baseline operating condition technique in order to provide the control signaling to the combination of on-board sensors, determine the baseline operating condition signal containing information about the baseline operating condition of the machinery or equipment, and store the baseline operating condition signal, e.g., which gets implemented during an initialization of the condition monitoring device.

The control signaling may include a non-contacting IR temperature sensing control signal, a magnet flux sensing control signal and a 3-axis vibration measurement control signal for providing to the combination of on-board sensors.

The condition monitoring device may include a wireless communication module configured to exchange wireless communication signaling with another wireless communication enabled device, e.g., such as a smart phone, a laptop, a personal computer, a remote server, etc.

The wireless communication signaling may include the condition monitoring signal determined and provided by the condition monitoring device.

The wireless communication signaling may include, e.g., Bluetooth, Near Field or WiFI communication signaling.

The condition monitoring device may include an initial configuration module configured to respond to initial configuration signaling and turn ON the condition monitoring module.

The initial configuration signaling may be magnetic signaling, e.g., caused by a user placing a magnet in relation to some part of the condition monitoring device.

The condition monitoring device include a chip electronic ID module configured to receive the control signaling and provide chip electronic ID signaling containing information about a chip electronic ID (CHIP_ID) of the condition monitoring device.

The cover assembly may include a top cover having a QR code printed thereon containing information about the condition monitoring device.

The QR code may contain an ID_QR that is unique to the condition monitoring device.

The condition monitoring device may include a printed circuit board assembly having the combination of on-board sensors, the condition monitoring module, as well as other modules all configured thereon.

The top cover may include an X, Y, Z orientation indicator that is molded or affixed as a label.

The X, Y, Z orientation indicator may be configured with an X-axis indicator, a Y-axis indicator and a Z-axis indicator to orient the condition monitoring device so that the 3-axis vibration measurement module senses a 3-axis vibration of a motor shaft of the machinery with an X-axis alignment to sense axial vibration of the motor shaft, a Y-axis alignment to sense horizontal vibration of the motor shaft and a Z-axis alignment to sense radial vibration of the motor shaft.

The Condition Monitoring System Wireless Pairing

According to some embodiments, the present invention may include, or take the form of, a condition monitoring system for monitoring machinery or equipment, e.g., having a condition monitoring device as described herein in combination with a wireless communication enabled device.

The condition monitoring device may include:
a wireless communication pairing module configured to provide wireless communication pairing signaling containing information for pairing the condition monitoring device, and
a cover assembly having a QR code arranged thereon to be scanned in order to receive QR code signaling containing information for pairing the condition monitoring device.

The wireless communication enabled device may include:

a QR scanning app configured to scan the QR code, and receive QR code signaling (e.g., from the Internet, from cellular data, etc.), and a pairing app configured to receive the wireless communication pairing signaling generated by the condition monitoring device and the QR code signaling, and pair the wireless communication enabled device with the condition monitoring device based upon the signaling received.

The wireless communication pairing signaling may include an advertisement packet having a unique wireless communication chip electronic identification for identifying the condition monitoring device; and the QR code signaling may contain an ID_QR for providing back to the condition monitoring device after pairing.

The pairing app may be configured to provide unique user identification (UUID) signaling containing a combination of the QR code signaling and the wireless communication pairing signaling received.

The wireless communication pairing module may be configured to receive the UUID signaling, and determine an updated UUID signaling containing the ID_QR.

Additional Sensors

Moreover, the condition monitoring system for monitoring machinery or equipment may include a condition monitoring device as disclosed herein, as well as a further combination of one or more sensors, including:

a pressure sensor configured to sense a pressure of a fluid being processed by the machinery or equipment and provide pressure sensor signaling containing information about the pressure sensed, a flow rate sensor configured to sense a flow rate of the fluid being processed by the machinery or equipment and provide flow rate sensor signaling containing information about the flow rate sensed, a fluid quality sensor configured to sense a quality of the fluid being processed by the machinery or equipment and provide fluid quality sensor signaling containing information about the fluid quality sensed, a motor operating condition sensor configured to sense a condition of a motor operating the machinery or equipment and provide motor operating condition sensor signaling containing information about the condition sensed of the motor, a motor load condition sensor configured to sense a load condition of a motor operating the machinery or equipment and provide motor load condition sensor signaling containing information about the load condition sensed of the motor, a power consumption or efficiency sensor configured to sense a power consumption or efficiency of the machinery or equipment and provide power consumption or efficiency sensor signaling containing information about the power consumption or efficiency sensed of the machinery or equipment, and a fluid viscosity sensor configured to sense a fluid viscosity of the fluid being processed by the machinery or equipment and provide fluid viscosity sensor signaling containing information about the fluid viscosity sensed.

In operation, the condition monitoring system may monitor the machinery or equipment, e.g., using data received in the associated signaling from these additional sensors together with the data from the combination of on-board sensors on the condition monitoring device. In addition, the condition monitoring device may also be suitably configured on-board with one or more of these additional sensors.

BRIEF DESCRIPTION OF THE DRAWING

The drawing, which is not necessarily drawn to scale, includes the following Figures:

FIG. 1A is a diagram of a condition monitoring system having a condition monitoring device coupled via Bluetooth to a wireless communication enable device, such as a smart phone or tablet, for providing a condition monitoring signal containing information about an operating condition of machinery or equipment, according to some embodiments of the present invention.

FIG. 1B is a diagram of a condition monitoring system having a condition monitoring device coupled via Bluetooth to a wireless communication enable device, such as a smart phone or tablet, and also coupled to at least one other communication device receiving sensed signaling from at least one additional sensor, such as a pressure sensor, for providing a condition monitoring signal containing information about an operating condition of machinery or equipment, according to some embodiments of the present invention.

FIG. 1C is a diagram of a condition monitoring system having a condition monitoring device coupled to a network having other devices and components, e.g., including machinery, such as pumps, a wireless communication enable device, such as a smart phone or tablet, and other remote wireless communication enable device, according to some embodiments of the present invention.

FIG. 2A is a picture of a condition monitoring device having a Quick Response Code attached or printed thereon, according to some embodiments of the present invention.

FIG. 2B is an exploded view of a condition monitoring device having an LED tube, a top cover, a bottom cover, a battery strap, a replaceable battery pack, a battery holder, a printed circuit Board Assembly (PCBA), a lens, and numerous screws, according to some embodiments of the present invention.

FIG. 2C is a list of parts/component in the condition monitoring device shown in FIG. 2B, according to some embodiments of the present invention.

FIG. 3 is a block diagram of a condition monitoring device, according to some embodiments of the present invention.

FIG. 4 is a block diagram of a condition monitoring system, according to some embodiments of the present invention.

FIG. 5A is a diagram of a mounting configuration, according to some embodiments of the present invention.

FIGS. 5B, 5C and 5D are diagrams of different mounting feet having different diameters (e.g., including 200 mm, 350 mm or 500 mm) that may form part of the mounting configuration in FIG. 5A, according to some embodiments of the present invention.

FIG. 6 is a flowchart of a process to create a system UUID that includes an electronic ID, a visible ID, user action and app activity, according to some embodiments of the present invention. (In FIG. 6, the term "xTag" is understood to refer to the condition monitoring device, which is also known and branded as the "Optimyze" device, e.g., as shown in FIG. 2A.)

FIG. 7A is a chart showing examples of sensor deviation from baseline operating conditions, which includes examples of closed valve scenarios, observations for a single sensor configuration, a dual sensor configuration and a three sensor configuration of the condition monitoring device (xTag) shown in FIG. 1A and the condition monitoring systems in FIGS. 1B and 1C, flux sensing, IR temperature sensing, vibration sensing, pressure sensing, flow rate sensing, power sensing, along with potential issues for the single sensor configuration, the dual sensor configuration and the three sensor configuration of the condition monitoring device (xTag) shown in FIG. 1A and the condition monitoring systems in FIGS. 1B and 1C having a different diagnosis when the data synthesis technique is implemented, according to some embodiments of the present invention.

FIG. 7B is a chart showing examples of sensor deviation from baseline operating conditions, which includes examples of bearing failure scenarios, observations for a single sensor configuration, a dual sensor configuration and a three sensor configuration of the condition monitoring device (xTag) shown in FIG. 1A and the condition monitoring systems in FIGS. 1B and 1C, flux sensing, IR temperature sensing, vibration sensing, pressure sensing, flow rate sensing, power sensing, along with potential issues for the single sensor configuration, the dual sensor configuration and the three sensor configuration of the condition monitoring device (xTag) shown in FIG. 1A and the condition monitoring systems in FIGS. 1B and 1C when the data synthesis technique is implemented, according to some embodiments of the present invention.

Similar parts or components in Figures are labeled with similar reference numerals and labels for consistency. Every lead line and associated reference label for every element is not included in every Figure of the drawing to reduce clutter in the drawing as a whole.

DETAILED DESCRIPTION OF THE INVENTION

According to the present invention, FIGS. 1A, 1B and 1C show condition monitoring systems 20, 40, 60 that use a condition monitoring device 100, 100' (aka "xTag") for measuring or sensing 3-axis vibration, temperature and magnetic flux of a rotating or static machinery or equipment (see FIG. 10). Embodiments include adding inputs from other sensors or instruments, including but not limited to, pressure sensors, water quality sensors, etc., which may include $3^{rd}$ party sensors, e.g., as shown in FIG. 1B. A wireless communication device like element 115 (e.g., some near field communication (NFC) device) may be configured to receive pressure sensor signaling from a pressure sensor and condition monitoring signaling from the condition monitoring device 100, and provide wireless communication signaling containing information about the pressure sensor signaling and the condition monitoring signaling received, as shown in FIG. 1B. The wireless communication device 115 may be controlled by a controller like element 115a. Measured or sensed data may be processed in the condition monitoring device 100. 100' and compared against, e.g., industry and/or user defined limits for acceptable operating levels of the rotating machinery, as well as compared against a baseline operating condition determined during some initialization of the condition monitoring device in relation to the rotating machinery, or some combination of the aforementioned. The condition monitoring device 100, 100' can store processed and raw data until transmission to a remote receiving device, e.g., which may include a handheld phone/tablet 110, as well as an Edge Gateway, Variable Frequency Drives, Building Management Systems (BMS), etc.

The processed data can be transmitted wirelessly (e.g., via Bluetooth 112, WiFi 114, or NFC 115) to the remote receiving device 110, e.g., as shown in FIGS. 1A, 1B, 1C. The remote receiving device 110 may be able to further process the data for historical trends and present the information to operators/engineers/building owners to provide insight into the functioning of the machinery or equipment and store the data remotely for collaboration with other engineers/operators or systems. Embodiments may include the remote receiving device configured to implement predictive failure analysis, prescriptive analysis to support optimization algorithms for operating conditions, replacement part ordering, etc.

The data from the condition monitoring device 100, 100' may provide operating information to technicians/engineers and building managers. The data can be used to guide maintenance and protect machinery, equipment or pumps from damage, increase uptime, or operating efficiency. The vibration and temperature data can provide insight to the condition of the machinery, equipment or pumps, e.g., including whether maintenance or replacement is necessary. The magnetic flux data can provide insight into the motor operating condition, direction, and loading, among other factors.

The combination of the data from the combination of multiple sensors can be used to assess the functioning of individual pieces of machinery and/or systems. The synthesis of data from the combination of the multiple sensors may provide more insightful information into the machinery, equipment and system functioning than could otherwise be determined by individual sensors alone. Examples of this feature and a further discussion thereof is developed in relation to the description of FIGS. 7A and 7B.

The condition monitoring system 20, 40, 60 may utilize Unique User IDs (UUID) created by combining unique identifiers internal to each condition monitoring device 100 and the condition monitoring device's external QR code 118 to create secure communications to the remote received device 110 and maintain a visual link between the data and each condition monitoring device via the QR code label 119. Examples of this feature and a further discussion thereof is developed in relation to the description of FIG. 6.

According to some embodiments, the condition monitoring system 20, 40, 60 may include one or more additional sensors collectively identified as 116 ((FIG. 4) for measurements of flow rates, temperatures of fluids, fluid pressures, water quality monitoring, motor operating conditions, load conditions, rotating direction, power consumption/efficiency, rotating frequency, fluid viscosity, etc. However, the scope of the invention is not intended to be limited to the type or kind of the one or more additional measurements, e.g., including types or kinds now known or later developed in the future.

The condition monitoring device or edge gateway may interface with a Variable Frequency Drive (VFD), e.g., including VFDs using sensorless technology, to optimize pumping operations and improve system efficiency.

According to some embodiments, the present invention may be implemented with Bluetooth transmission capability, e.g., as shown in FIGS. 1A, 1B, 1C. However, embodiments are envisioned, and the scope of the invention is intended to include, using implementation with WiFi and/or NFC capability and may or may not include Gateway access. Moreover, embodiments are envisioned, and the scope of the invention is intended to include, using other types or kinds of communication protocol, e.g., including types or kinds now known or later developed in the future. Condition monitoring devices may also be networked together with wired or wireless technology to create a network of measurement devices and support communication across larger distances.

The addition of the WiFi communication 114 with a Gateway (or other communication device) will enable remote, real-time monitoring of the condition monitoring device (FIG. 1A below), and consequently system performance.

The vibration and temperature data can provide insight to the machinery's, equipment's or asset's condition and whether maintenance or replacement is necessary. The magnetic flux data can provide insight into the motor operating condition, direction, and loading, among other factors, of the machinery.

In addition to monitoring equipment, the condition monitoring device may support the creation of a fixed asset location management system. Through the process of pairing the condition monitoring device via Bluetooth to a mobile device, and using the mobile device's location services (GPS), it is possible to create a map of fixed asset enabling more efficient supervision and maintenance of the machinery or equipment over time.

The X, Y, Z Orientation Indicator 125

According to some embodiments, the condition monitoring device 100 may include an X, Y, Z orientation indicator 125, e.g., as shown in FIG. 2A, which may be molded on the top cover 3, or affixed as a label, etc.

The X, Y, Z orientation indicator 125 may be used to orient the condition monitoring device 100 so that the 3-axis vibration measurement module 106 (FIG. 3) may properly sense a 3-axis vibration of a motor shaft of the machinery, implement the 3-axis vibration analysis and detect potential bearing problems of the machinery that could not otherwise be detected using 1-axis or 2-axis vibration analysis. The X, Y, Z orientation indicator 125 allows the user to orient the condition monitoring device 100 into an X-axis alignment to sense axial vibration of the motor shaft, a Y-axis alignment to sense horizontal vibration of the motor shaft, and a Z-axis alignment to sense radial vibration of the motor shaft.

Unique User ID

By way of example, and according to some embodiments of the present invention, a variable UUID setting procedure may be implemented as follows:

The Parameters

ID_CHIP: The internal chip identification. It is unique for every xTag.

ID_XTAG_SVC_ID: The xTag BLE (Bluetooth) service id. All xTag(s) share the same value. Immutable.

ID_QR: The ID_QR is read back from a QR code 118, e.g. as a 4-byte integer.

ID_DB: The ID_DB is stored in database.

ID_XTAG: The ID_XTAG is broadcasted in user data section from the xTag, a combination of ID_CHIP and a user assigned UID.

By way of example, the format may take the form of:
aa aa aa aa bb bb bb bb, where
  aa aa aa aa: a 4 byte fixed id presenting the unique ID_CHIP; and
  bb bb bb bb: the user assigned UID, default value 00 00 00 00.

Example of an Implementation

1. During manufacturing, the manufacturer prints a computer generated ID onto a QR code (e.g., assuming that the id is 0x12345678). The Xtag reads back its own ID_CHIP (assuming it is 0x98765432) Therefore, ID_QR=0x12345678, ID_CHIP=0x98765432, and the combined ID_XTAG before configuration is ID_XTAG=0x9876543200000000. The ID_QR is NOT saved into the xTag at this point.

2. The user turns on the xTag, e.g., with a magnet for initial configuration. The Xtag starts to broadcast an advertisement packet. The packet data format may take the form of: a random mac address, a flag, an ID_XTAG_SVC_ID and an ID_XTAG (e.g., 0x9876543200000000+). The "+" sign is an extra bit that means the xTag is under or still in its configurating mode.

3. The wireless enabled mobile device has a user app that scans the QR code 118 (FIG. 2A), getting the ID_QR (e.g., 0x12345678).

4. The mobile user app scans all BLE devices in the local region. By way of example, the mobile user app may get a list like this:
  a. MAC1, flag, svc id1, user data1
  b. MAC2, flag, svc id2,
  c. MAC3, flag, svc id3, user data2
  d. MAC4, flag, ID_XTAG_SVC_ID, ID_XTAG (0x9876543200000000+) (e.g., this is an xTag, configurable)

5. The mobile user app compares the svc id with the ID_XTAG_SVC_ID, discarding all non-relative BLE device (e.g., devices a, b, and c). In addition, the extra "x" bit in the user data section indicating this xTag in under its configuring mode. The mobile user app pinpoints out the xTag of device d and returns it to the user.

6. The mobile user app initiates the pairing with an internal stored pairing key and exchanges an encryption key. A secured connection is established between the condition monitoring device (xTag) and the wireless enabled mobile device.

7. The user sets the threshold values and write the ID_QR (0x12345678) into the xTag. In addition, the app writes the ID_QR (0x12345678) to its local database and iCloud. Starting from this point, ID_XTAG=0x9876543212345678

8. The user closes the BLE connection and removes the magnet.

9. The Xtag enters its recording mode.

10. After certain time, a maintenance engineer holds the handheld device (i.e., wireless enabled mobile device) close to the xTag. The mobile user app scans all BLE devices in the local region. By way of example, the app gets a list.
  a. MAC1, flag, svc id1, user data1
  b. MAC2, flag, svc id2,
  c. MAC3, flag, svc id3, user data2
  d. MAC4, flag, ID_XTAG_SVC_ID, ID_XTAG1 (0x9876543212345678) (this is one xTag, the one configurated previously, non-configurable)
  e. MAC5, flag, ID_XTAG_SVC_ID, ID_XTAG2 (0x4433221145678901) (this is another xTag. non-configurable)

11. The mobile user app discards all BLE device with different svc id (e.g., device a, b and c), so only lines for devices d and e is left.

12. The mobile user app reads back the record from xTag d and e one by one and closes the connection.
13. The mobile user app stores the data read into local database and iCloud with the same id, e.g. the data from xTag with ID_XTAG1(0x9876543212345678) stores into the database record with ID_DB1(0x12345678).
14. Because the xTag is not under its configuring mode, all attempts to change the settings are discarded.
15. As a backup method, the user assigned UID can be retrieved by the device information service.

Data Synthesis for Improved Diagnostics

The combination of the data from multiple sensors can be used to improve the assessment of individual pieces of machinery, equipment and/or systems. The synthesis of data from multiple sensors will provide more insightful information into machinery, equipment and system functioning than can be determined by using individual sensors alone. By way of example, and according to some embodiments of the present invention, the data synthesis condition monitoring technique is best illustrated through the following examples.

Example 1

The motor driving a pump in a particular closed loop system is being monitored with a flux monitoring module, e.g., on-board the condition monitoring device. The flux monitoring module shows a reduction in motor flux, which could lead a technician to suspect an issue with the motor. The technician could then check the drive unit and see that the power has also dropped. The issue could now be with the motor or with incoming power.

Additional sensors data, such as an increase in a vibration sensor on the pump or temperature increase in the pump, would help the technician rule out motor or incoming power issues, and guide the technician to investigate system issues—such as a closed valve in the system that is causing the pump to dead head.

The table in FIG. 7A identifies potential problems associated with identifying changes when using individual sensors or pairs of sensors. The last row of the table in FIG. 7A for the xTag shows how the use of the combination of all the multiple sensors provides a more complete analysis of the system and machinery and will lead to a diagnosis of the problem with higher confidence than when analyzing data from any single or dual sensor as shown in the other six (6) rows above it.

By way of example, the condition monitoring device according to the present invention will receive sensed signaling containing information/data about the flux, IR temp and vibration sensed, as well as the pressure, flow rate and power sensed, implement the data synthesis condition monitoring technique, provide a condition monitoring signal containing indications of the flux, IR temp and vibration sensed, as well as pressure, flow rate and power sensed, and may also provide a further indication of potential issues re closed valve when so determined. In other words, if the data synthesis condition monitoring technique determines that there are no potential issues re closed valve condition so determined, then the condition monitoring device may provide no further indication, e.g., for review by the technician, etc.

Example 2

By way of further example, consider a second scenario in which a temperature increase is identified on a motor of the machinery or equipment. This could be caused by a system restriction increasing the load, or an issue within the motor itself. Now, add in a second sensor indicating that vibration has increased, and also and a third sensor indicating that power has increased. Combined with other sensors showing stable flow rate and pressure (i.e. system is functioning correctly), increasing the confidence in properly diagnosing a motor bearing failure increases significantly.

The combination of data from multiple sensors creates a more holistic view of the system function allowing diagnosis of potential problems with higher accuracy. The data gather over time in which a condition monitoring device (xTag) provides functional data into a larger ecosystem of remote and on-board sensors (FIG. 1C), will allow a diagnosis of potential issues in advance as small perturbations are identified earlier before they become system level down-time problems.

The last row of the table in FIG. 7B for the xTag shows how the use of the combination of all the multiple sensors provides a more complete analysis of the system and machinery and will lead to a diagnosis of the problem with higher confidence than when analyzing data from any single sensor as shown in the other four (4) rows above it.

By way of further example, the condition monitoring device according to the present invention will receive sensed signaling containing information/data about the flux, IR temp and vibration sensed, as well as pressure, flow rate and power sensed, implement the data synthesis condition monitoring technique, provide a condition monitoring signal containing indications of the flux, IR temp and vibration sensed, as well as pressure, flow rate and power sensed, and may also provide a further indication of potential issues re bearing failure when so determined. In other words, if the data synthesis condition monitoring technique determines that there are no potential issues re bearing failure so determined, then the condition monitoring device may provide no further indication, e.g., for review by the technician, etc.

The Data Synthesis Condition Monitoring Technique

The data synthesis condition monitoring technique is understood to be a data processing tool that gathers and continues to learn information/data about the machinery or equipment being monitored, builds an ongoing processing tool database, identifies potential issues based upon the processing tool database, and provides suitable indication in the condition monitoring signal regarding the same. The data processing tool may include user defined limits or industry threshold limits suitably programmed therein, etc. One skilled in the art after reading the instant disclosure would be able to implement, further develop out and expand onto the data synthesis condition monitoring technique disclosed herein, which is continuously building an on-going time dependent database.

Wireless Pairing

According to some embodiments, the present invention may include, or take the form of, a condition monitoring system 20, 40, 60 for monitoring machinery or equipment, e.g., having a condition monitoring device 100, 110' as described herein in combination with a wireless communication enabled device.

The condition monitoring device 100, 110' may include:

a wireless communication pairing module 120 configured to provide wireless communication pairing signaling containing information for pairing the condition monitoring device, and a cover assembly 3, 12 (FIG. 2B) having a QR code 118 arranged thereon to be scanned in order to receive QR code signaling containing information for pairing the condition monitoring device.

The wireless communication enabled device 110 may include:

a QR scanning app 110a configured to scan the QR code 118, and receive QR code signaling (e.g., from the Internet, from cellular data, etc.), and a pairing app or module 110b configured to receive the wireless communication pairing signaling generated by the condition monitoring device, receive the QR code signaling, and pair the wireless communication enabled device with the condition monitoring device based upon the signaling received.

The Modules 102, 104, 106, 108, 110a, 110b

By way of example, the functionality of the modules 102, 104, 106, 108, 110a, 110b can be implemented using hardware, software, firmware, or a combination thereof. In a typical software implementation, the modules 102, 104, 106, 108, 110a, 110b would include one or more microprocessor-based architectures having, e. g., at least one signal processor or microprocessor. A person skilled in the art would be able to program such a microcontroller (or microprocessor)-based implementation to perform the functionality described herein without undue experimentation. The scope of the invention is not intended to be limited to any particular implementation using technology either now known or later developed in the future. The scope of the invention is intended to include implementing the functionality of the processors as stand-alone processor or processor module, as separate processor or processor modules, as well as some combination thereof.

The modules 102, 104, 106, 108, 110a, 110b may also include other signal processor circuits or components 109, e.g. including memory modules like random access memory (RAM) and/or read only memory (ROM), input/output devices and control, and data and address buses connecting the same, and/or at least one input processor and at least one output processor.

LIST OF POSSIBLE APPLICATIONS

The condition monitoring system can be used in any application with rotating machinery or equipment. By way of example, core applications may include:
Process critical industrial pumps
HVAC pumps
Water and wastewater pumps
Industrial equipment
Oscillating equipment
Etc.

The Scope of the Invention

The embodiments shown and described in detail herein are provided by way of example only; and the scope of the invention is not intended to be limited to the particular configurations, dimensionalities, and/or design details of these parts or elements included herein. In other words, one skilled in the art would appreciate that design changes to these embodiments may be made and such that the resulting embodiments would be different than the embodiments disclosed herein, but would still be within the overall spirit of the present invention.

It should be understood that, unless stated otherwise herein, any of the features, characteristics, alternatives or modifications described regarding a particular embodiment herein may also be applied, used, or incorporated with any other embodiment described herein.

Although the invention has been described and illustrated with respect to exemplary embodiments thereof, the foregoing and various other additions and omissions may be made therein and thereto without departing from the spirit and scope of the present invention.

What we claim is:

1. A condition monitoring device for monitoring machinery or equipment, comprising:
    a combination of on-board sensors that include
        a non-contacting temperature sensing module configured to receive control signaling and provide a non-contacting temperature sensing signal containing information about a temperature of the machinery or equipment without direct surface contact between the non-contacting temperature sensing module and the machinery or equipment,
        a magnet flux sensing module configured to receive the control signaling and provide a magnet flux sensing signal containing information about magnet flux sensed from the machinery or equipment, and
        a 3-axis vibration measurement module configured to receive the control signaling and provide a 3-axis vibration measurement sensing signal containing information about a 3-axis vibration measurement of the machinery or equipment; and
    a condition monitoring module configured to
        provide the control signaling to the combination of on-board sensors,
        receive a baseline operating condition signal containing information about a baseline operating condition of the machinery or equipment,
        receive the non-contacting temperature sensing signal, the magnet flux sensing signal, and the 3-axis vibration measurement sensing signal from the combination of on-board sensors, and
        provide a condition monitoring signal containing information about an operating condition of the machinery or equipment, based upon a data synthesis condition monitoring technique that synthesizes non-contact temperature sensing, magnetic flux and 3-axis vibration data received from the combination of on-board sensors, determines a current operating condition of the machinery or equipment, and compares the current operating condition and the baseline operating condition of the machinery or equipment to determine the operating condition;
    wherein the condition monitoring device comprises a printed circuit board assembly having the combination of on-board sensors and the condition monitoring module all configured thereon.

2. The condition monitoring device according to claim 1, wherein the non-contacting temperature sensing module is configured to provide infrared (IR) signaling to the machinery or equipment and receive reflected IR signaling from the machinery or equipment containing information about the temperature of the machinery or equipment.

3. The condition monitoring device according to claim 1, wherein the magnet flux sensing module is configured to implement a Fast Fourier Transform (FFT) analysis and determine a rotation direction, rotating speed, motor load and motor health of the machinery or equipment.

4. The condition monitoring device according to claim 1, wherein the 3-axis vibration measurement module is configured to sense a 3-axis vibration of a motor shaft of the machinery or equipment and implement a 3-axis vibration analysis and detect potential bearing problems of the machinery or equipment that could not be detected using 1-axis or 2-axis vibration analysis, including where the 3-axis vibration analysis includes using an X-axis aligned to sense axial vibration of the motor shaft, a Y-axis aligned to sense horizontal vibration of the motor shaft and a Z-axis aligned to sense radial vibration of the motor shaft.

5. The condition monitoring device according to claim 1, wherein the condition monitoring module is configured to implement a baseline operating condition technique in order to provide the control signaling to the combination of on-board sensors, determine the baseline operating condition signal containing information about the baseline operating condition of the machinery or equipment, and store the baseline operating condition signal.

6. The condition monitoring device according to claim 1, wherein the control signaling includes a non-contacting IR temperature sensing control signal, a magnet flux sensing control signal and a 3-axis vibration measurement control signal for providing to the combination of on-board sensors.

7. The condition monitoring device according to claim 1, wherein the condition monitoring device comprises a wireless communication module configured to exchange wireless communication signaling with another wireless communication enabled device.

8. The condition monitoring device according to claim 7, wherein the wireless communication signaling includes the condition monitoring signal.

9. The condition monitoring device according to claim 7, wherein the wireless communication signaling includes Bluetooth, Near Field or WiFi communication signaling.

10. A system for monitoring machinery, comprising:
the condition monitoring device according to claim 7;
the condition monitoring device includes:
  a wireless communication pairing module configured to provide wireless communication pairing signaling containing information for pairing the condition monitoring device;
  a cover assembly having a Quick Response (QR) code arranged thereon to be scanned in order to receive QR code signaling containing information for pairing the condition monitoring device; and
a wireless communication enabled device includes:
  a QR scanning app configured to scan the QR code, and receive QR code signaling, and
  a pairing app configured to receive the wireless communication pairing signaling and the QR code signaling, and pair the wireless communication enabled device with the condition monitoring device based upon the signaling received.

11. The system according to claim 10, wherein
the wireless communication pairing signaling includes an advertisement packet having a unique wireless communication chip electronic identification for identifying the condition monitoring device; and
the QR code signaling contains an ID_QR for providing back to the condition monitoring device.

12. The system according to claim 11, wherein the pairing app is configured to provide unique user identification (UUID) signaling containing a combination of the QR code signaling and the wireless communication pairing signaling received.

13. The system according to claim 12, wherein the wireless communication pairing module is configured to receive the UUID signaling, and determines an updated UUID signaling containing the ID_QR.

14. A system for monitoring machinery, comprising:
the condition monitoring device according to claim 8;
the system further comprises a further combination of one or more sensors, including:
  a pressure sensor configured to sense a pressure of a fluid being processed by the machinery and provide pressure sensor signaling containing information about the pressure sensed,
  a flow rate sensor configured to sense a flow rate of the fluid being processed by the machinery and provide flow rate sensor signaling containing information about the flow rate sensed,
  a fluid quality sensor configured to sense a quality of the fluid being processed by the machinery and provide fluid quality sensor signaling containing information about the fluid quality sensed,
  a motor operating condition sensor configured to sense a condition of a motor operating the machinery and provide motor operating condition sensor signaling containing information about the condition sensed of the motor,
  a motor load condition sensor configured to sense a load condition of a motor operating the machinery and provide motor load condition sensor signaling containing information about the load condition sensed of the motor,
  a power consumption or efficiency sensor configured to sense a power consumption or efficiency of the machinery and provide power consumption or efficiency sensor signaling containing information about the power consumption or efficiency sensed of the machinery, and
  a fluid viscosity sensor configured to sense a fluid viscosity of the fluid being processed by the machinery and provide fluid viscosity sensor signaling containing information about the fluid viscosity sensed.

15. The condition monitoring device according to claim 1, wherein the condition monitoring comprises an initial configuration module configured to respond to initial configuration signaling and turn ON the condition monitoring module.

16. The condition monitoring device according to claim 1, wherein the condition monitoring device comprises a chip electronic ID module configured to receive the control signaling and provide chip electronic ID signaling containing information about a chip electronic ID (CHIP_ID) of the condition monitoring device.

17. A condition monitoring device for monitoring machinery or equipment, comprising:
a combination of on-board sensors that include
  a non-contacting temperature sensing module configured to receive control signaling and provide a non-contacting temperature sensing signal containing information about a temperature of the machinery or equipment without direct surface contact between the non-contacting temperature sensing module and the machinery or equipment,
  a magnet flux sensing module configured to receive the control signaling and provide a magnet flux sensing signal containing information about magnet flux sensed from the machinery or equipment, and a 3-axis vibration measurement module configured to receive the control signaling and provide a 3-axis vibration measurement sensing signal containing information about a 3-axis vibration measurement of the machinery or equipment; and a condition monitoring module configured to provide the control signaling to the combination of on-board sensors, receive a baseline operating condition signal containing information about a baseline operating condition of the machinery or equipment, receive the non-contacting temperature sensing signal, the magnet flux sensing signal, and the 3-axis vibration measurement sensing signal from the combination of on-board sensors, and provide a condition monitoring signal containing information about an operating condition of the machinery or equipment, based upon a data synthesis condition monitoring technique that synthesizes non-contact temperature sensing, magnetic flux and 3-axis vibration data received from the combination of on-board sensors, determines a current operating condition of the machinery or equipment, and compares the current operating condition and the baseline operating condition of the machinery or equipment to determine the operating condition;

wherein the non-contacting temperature sensing module is configured to provide infrared (IR) signaling to the machinery or equipment and receive reflected IR signaling from the machinery or equipment containing information about the temperature of the machinery or equipment; and the condition monitoring device comprises a cover assembly configured to contain the combination of on-board sensors and condition monitoring module, the cover assembly having a bottom cover with an infrared sensor window configured therein; and the non-contacting temperature sensing module is configured to provide the IR signaling through the infrared sensor window and receive the reflected IR signaling back through the infrared sensor window.

18. The condition monitoring device for monitoring machinery or equipment, comprising:

a combination of on-board sensors that include a non-contacting temperature sensing module configured to receive control signaling and provide a non-contacting temperature sensing signal containing information about a temperature of the machinery or equipment without direct surface contact between the non-contacting temperature sensing module and the machinery or equipment, a magnet flux sensing module configured to receive the control signaling and provide a magnet flux sensing signal containing information about magnet flux sensed from the machinery or equipment, and a 3-axis vibration measurement module configured to receive the control signaling and provide a 3-axis vibration measurement sensing signal containing information about a 3-axis vibration measurement of the machinery or equipment; and a condition monitoring module configured to provide the control signaling to the combination of on-board sensors receive a baseline operating condition signal containing information about a baseline operating condition of the machinery or equipment, receive the non-contacting temperature sensing signal, the magnet flux sensing signal, and the 3-axis vibration measurement sensing signal from the combination of on-board sensors, and provide a condition monitoring signal containing information about an operating condition of the machinery or equipment, based upon a data synthesis condition monitoring technique that synthesizes non-contact temperature sensing, magnetic flux and 3-axis vibration data received from the combination of on-board sensors, determines a current operating condition of the machinery or equipment, and compares the current operating condition and the baseline operating condition of the machinery or equipment to determine the operating condition;

the condition monitoring device comprises a wireless communication module configured to exchange wireless communication signaling with another wireless communication enabled device;

the wireless communication signaling includes Bluetooth, Near Field or WiFi communication signaling; and the initial configuration signaling is magnetic signaling.

19. The condition monitoring device according to claim 18, wherein the condition monitoring device comprises a printed circuit board assembly having the combination of on-board sensors and the condition monitoring module all configured thereon.

20. A condition monitoring device for monitoring machinery or equipment, comprising:

a combination of on-board sensors that include a non-contacting temperature sensing module configured to receive control signaling and provide a non-contacting temperature sensing signal containing information about a temperature of the machinery or equipment without direct surface contact between the non-contacting temperature sensing module and the machinery or equipment, a magnet flux sensing module configured to receive the control signaling and provide a magnet flux sensing signal containing information about magnet flux sensed from the machinery or equipment, and a 3-axis vibration measurement module configured to receive the control signaling and provide a 3-axis vibration measurement sensing signal containing information about a 3-axis vibration measurement of the machinery or equipment; and a condition monitoring module configured to provide the control signaling to the combination of on-board sensors, receive a baseline operating condition signal containing information about a baseline operating condition of the machinery or equipment, receive the non-contacting temperature sensing signal, the magnet flux sensing signal, and the 3-axis vibration measurement sensing signal from the combination of on-board sensors, and provide a condition monitoring signal containing information about an operating condition of the machinery or equipment, based upon a data synthesis condition monitoring technique that synthesizes non-contact temperature sensing, magnetic flux and 3-axis vibration data received from the combination of on-board sensors, determines a current operating condition of the machinery or equipment, and compares the current operating condition and the baseline operating condition of the machinery or equipment to determine the operating condition;

wherein the condition monitoring device comprises a cover assembly configured to contain the combination of on-board sensors and the condition monitoring device, and the cover assembly has a top cover having a Quick Response (QR) code printed thereon containing information about the condition monitoring device.

21. The condition monitoring device according to claim 20, wherein the QR code contains an ID_QR that is unique to the condition monitoring device.

22. A condition monitoring device for monitoring machinery or equipment, comprising:
a combination of on-board sensors that include
a non-contacting temperature sensing module configured to receive control signaling and provide a non-contacting temperature sensing signal containing information about a temperature of the machinery or equipment without direct surface contact between the non-contacting temperature sensing module and the machinery or equipment,
a magnet flux sensing module configured to receive the control signaling and provide a magnet flux sensing signal containing information about magnet flux sensed from the machinery or equipment, and
a 3-axis vibration measurement module configured to receive the control signaling and provide a 3-axis vibration measurement sensing signal containing information about a 3-axis vibration measurement of the machinery or equipment; and
a condition monitoring module configured to
provide the control signaling to the combination of on-board sensors,
receive a baseline operating condition signal containing information about a baseline operating condition of the machinery or equipment,
receive the non-contacting temperature sensing signal, the magnet flux sensing signal, and the 3-axis vibration measurement sensing signal from the combination of on-board sensors, and
provide a condition monitoring signal containing information about an operating condition of the machinery or equipment, based upon a data synthesis condition monitoring technique that synthesizes non-contact temperature sensing, magnetic flux and 3-axis vibration data received from the combination of on-board sensors, determines a current operating condition of the machinery or equipment, and compares the current operating condition and the baseline operating condition of the machinery or equipment to determine the operating condition;
wherein the condition monitoring device comprises a cover assembly having a top cover with an X, Y, Z orientation indicator that is molded or affixed as a label.

23. The condition monitoring device according to claim 22, wherein the X, Y, Z orientation indicator may be configured to orient the condition monitoring device so that the 3-axis vibration measurement module senses a 3-axis vibration of a motor shaft of the machinery with an X-axis alignment to sense axial vibration of the motor shaft, a Y-axis alignment to sense horizontal vibration of the motor shaft and a Z-axis alignment to sense radial vibration of the motor shaft.

* * * * *

UNITED STATES PATENT AND TRADEMARK OFFICE
CERTIFICATE OF CORRECTION

PATENT NO. : 11,686,610 B2
APPLICATION NO. : 17/110713
DATED : June 27, 2023
INVENTOR(S) : James J. Gu et al.

It is certified that error appears in the above-identified patent and that said Letters Patent is hereby corrected as shown below:

In the Claims

At Column 16, Line 9 (Claim 14), please remove "claim 8" and replace same with --claim 7--.

Signed and Sealed this
Twenty-ninth Day of August, 2023

*Katherine Kelly Vidal*

Katherine Kelly Vidal
*Director of the United States Patent and Trademark Office*